UNITED STATES PATENT OFFICE.

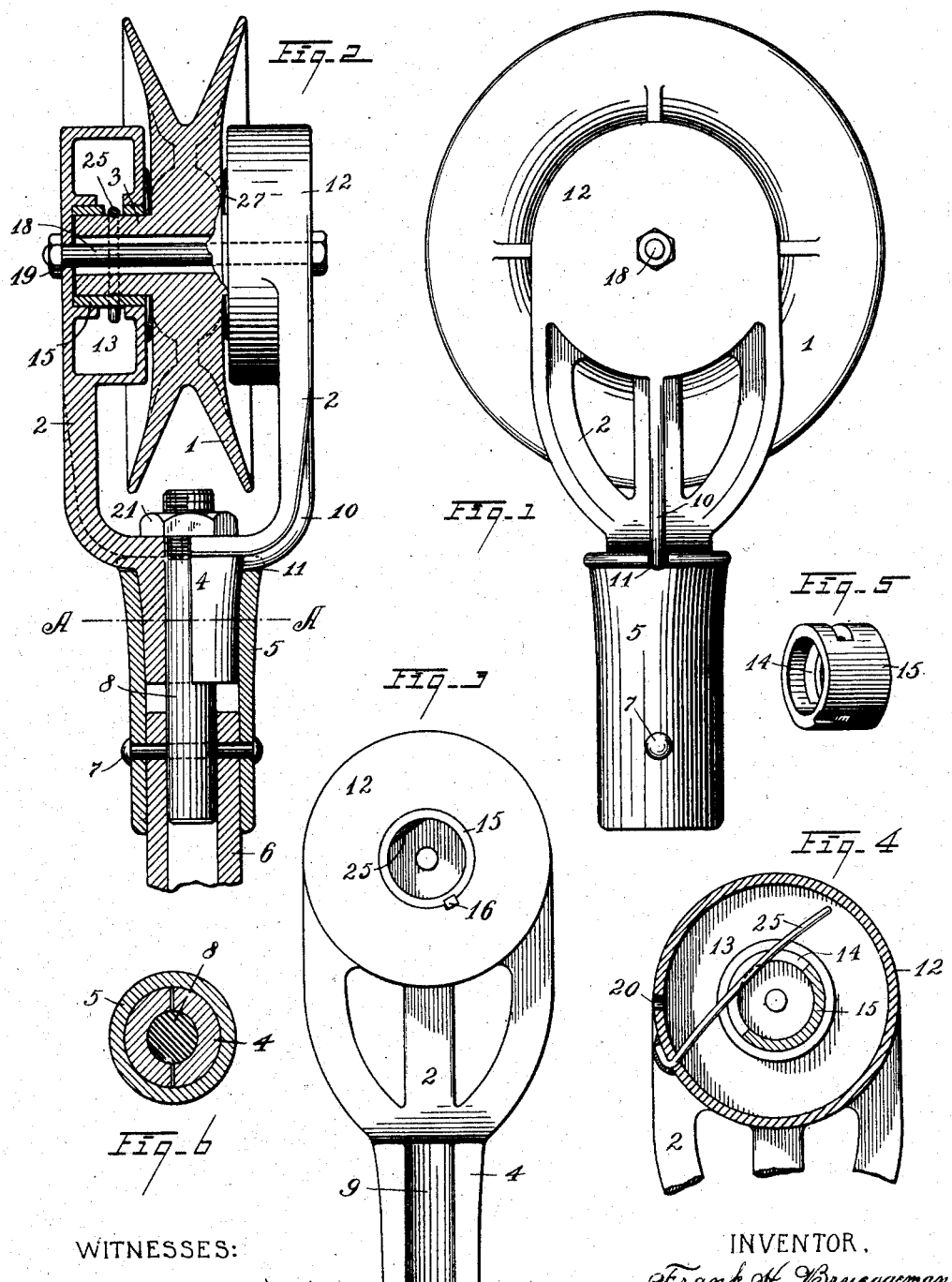

FRANK H. BRUEGGEMAN, OF NORWOOD, OHIO, ASSIGNOR, BY MESNE ASSIGNMENTS, OF ONE-HALF TO THE ACME AUTOMATIC STREET INDICATING COMPANY, OF CLEVELAND, OHIO, A CORPORATION OF OHIO.

TROLLEY-HARP.

No. 864,228.   Specification of Letters Patent.   Patented Aug. 27, 1907.

Application filed April 23, 1906. Serial No. 313,148.

*To all whom it may concern:*

Be it known that I, FRANK H. BRUEGGEMAN, a citizen of the United States, residing at Norwood, in the county of Hamilton and State of Ohio, have invented a certain new and useful Improvement in Trolley-Harps, of which the following is a full, clear, and exact description, reference being had to the accompanying drawings.

The object of this invention is to provide a trolley harp and wheel in a form which, while being simple and cheap in construction, shall be very efficient and durable in practice. The wheel is formed with integral axles and the harp is split to allow the wheel, when worn, to be removed and a new wheel put in the same harp.

My invention also provides hardened steel bearings, means for oiling them, and contact springs for the wheels.

The various features of the invention are hereinafter more fully explained and definitely summarized in the claims.

In the drawings, Figure 1 is a side elevation of the harp and wheel complete. Fig. 2 is an edge view of the same, partly in central section. Fig. 3 is an inner face view of one of the halves of the trolley harp. Fig. 4 is a sectional view parallel with Fig. 3. Fig. 5 is a perspective view of the bushing. Fig. 6 is a cross section on the line A—A of Fig. 2.

Referring by reference numerals to the embodiment shown in the drawings, 1 represents the trolley wheel and 2, 2 the two halves of the harp. The wheel has integral axles 3 extending from its opposite sides, and these axles are adapted to occupy recesses in the heads 12 of the harp. Each half of the harp has approximately semi-cylindrical extensions 4 at its lower end. These two extensions are placed with their edges abutting within a sleeve 5 which is permanently secured to the upper end of the trolley pole 6, as by the rivet 7. Extending from the trolley pole, and permanently secured to it by the rivet 7 is a bolt 8 which extends through an opening provided by recesses 9 in the extensions 4 of the harp. Webs 10 formed on the outer side of the harp occupy notches 11 in the sleeve, preventing the harp from turning, and a nut 21 screwed onto the bolt 8 securely holds the halves of the harp into place.

Carried by each half of the harp is a bushing 15. This bushing is preferably of hardened steel and snugly fits a recess in the harp head 12. The bore of the bushing is of such size as to receive the axle of the wheel with the proper degree of snugness. The bushing is preferably locked in place by a key 16. When the wheel is in place, the two arms of the harp are preferably held against possible springing by a bolt 18 passing through the heads and loosely through the wheel and having a nut 19.

By the above described construction, it will be seen that the wheel may be easily removed and replaced when worn; it is simply necessary to remove the nuts 19 and 21. The bearings being of case hardened steel are extremely durable, and the life of the wheel owing to the large bearing of brass on steel, is itself much greater than in the usual construction. By having a trolley wheel and its axle cast in one piece, no pins are required and it is impossible for the wheel to become lost from the harp.

To effectively lubricate the bearings, I form the harp heads 12 with annular recesses 13 adapted to carry the oil which passes to the bearings through slots 14 formed in the bushings 15. Suitable oil holes 20 are provided, whereby the annular chambers may be filled, these holes being normally plugged. This annular oil chamber and the elongated slot 14 through which the oil passes to the axle, allows the bearings to receive oil at any angle at which the trolley pole may be riding.

To insure an effective electric contact between the harp and wheel, I provide within the head 12, a contact spring 25, rigidly secured at its end to the wall of the head and extending across the bushing 15, through the slot 14 and bearing on the axle 3 of the wheel at such slot. To keep the wheel properly centered between the harp arms to prevent undue wear, a pair of washers 27 are provided, surrounding the axles 3 between the wheel and the respective heads 12, these washers being slightly dished, as shown, to give them a spring action.

It is to be noted that the two halves of the harp are alike, which is a convenience in their manufacture. The parts are few in number and in such form that they may be easily and cheaply constructed.

I claim:

1. The combination with separable sections of a trolley harp, each section having a hollow head with an opening in its inner wall and a smaller opening in its outer wall, of removable bushings seating in such heads and abutting said outer walls, a trolley wheel, tubular axles revoluble therewith and journaled in said bushings, and a bolt passing loosely through such axles, passing into the harp sections and provided with means engaging such sections.

2. The combination of a wheel, an axle rigid therewith, a harp having a recess, a bushing set in said recess, said axle occupying said bushing, said bushing having a slot formed through its wall, and a spring acting through such slot on the axle.

3. The combination of a wheel, a projecting axle therefor, a harp head which said axle occupies, said head having an annular recess adapted to contain oil for lubricating the axle, and a contact spring within the oil chamber secured at one end to the head and free at the other and intermediately bearing on the axle.

4. The combination with two halves of a trolley harp, each half having a hollow head with a recess, a bushing seated within said recess, an opening from the head through the wall of the bushing into the bore of the bushing, and a trolley wheel having rigid axles extending into such bushings, and springs carried by the harp occupying the hollow of the heads and the slots in the bushings and bearing on the axles of the wheel.

5. The combination of a sleeve, a trolley harp made in two halves adapted to seat in said sleeve, said harp having an external web occupying a notch in the end of the sleeve, and means for holding the harp halves in the sleeve.

6. The combination with a trolley wheel, of a harp made in two halves, said halves having approximately semi-cylindrical extensions, a sleeve adapted to surround said extensions, and an axial bolt rigid with the sleeve and extending between said extensions, and a nut screwing onto said bolt and bearing onto the two halves of the harp.

7. The combination with a trolley wheel of separable harp sections, each section having extensions, a sleeve adapted to surround said extensions, an axial bolt engaged within the sleeve and extending between said extensions, and means engaging the projecting portion of the bolt for holding the two harp sections in place.

In testimony whereof, I hereunto affix my signature in the presence of two witnesses.

FRANK H. BRUEGGEMAN.

Witnesses:
MABEL G. DAVIES,
F. W. JANSEN.